US00RE35911E

United States Patent [19]

Seitz et al.

[11] E Patent Number: Re. 35,911

[45] Reissued Date of Patent: Sep. 29, 1998

[54] METHOD FOR PREDICTING INK CONSUMPTION

[75] Inventors: David R. Seitz, Vandalia; Juli Ann Stuve, Dayton, both of Ohio

[73] Assignee: Ohio Electronic Engravers, Inc., Dayton, Ohio

[21] Appl. No.: 828,321

[22] Filed: Mar. 28, 1997

Related U.S. Patent Documents

Reissue of:

[64] Patent No.: 5,402,246
Issued: Mar. 28, 1995
Appl. No.: 97,061
Filed: Jul. 20, 1993

[51] Int. Cl.[6] ..... B41C 1/02; G01C 11/28

[52] U.S. Cl. ..... 358/299; 356/379

[58] Field of Search ..... 358/296, 299, 358/298, 300, 401, 406, 448, 456, 471, 474, 501, 504, 502; 382/112, 319; 399/1, 2, 9, 15, 27, 53; 347/5, 6, 7, 19; 395/101, 109; 356/378, 379

[56] References Cited

U.S. PATENT DOCUMENTS

| | | | |
|---|---|---|---|
| 3,918,348 | 11/1975 | Runft | 90/11 R |
| 3,931,570 | 1/1976 | George et al. | 324/34 R |
| 4,003,311 | 1/1977 | Bardin | 101/426 |
| 4,072,928 | 2/1978 | Wilder | 340/146.3 |
| 4,451,856 | 5/1984 | Buechler | 358/299 |
| 4,628,728 | 12/1986 | Taylor et al. | 73/149 |
| 4,944,593 | 7/1990 | Kalstroem et al. | 356/379 |
| 5,029,011 | 7/1991 | Fraser | 358/299 |
| 5,036,403 | 7/1991 | Hupka et al. | 358/299 |
| 5,293,426 | 3/1994 | Wouch et al. | 382/1 |
| 5,387,976 | 2/1995 | Lesniak | 356/379 |
| 5,414,452 | 5/1995 | Accatino et al. | 347/7 |
| 5,438,864 | 8/1995 | Morgan | 356/379 X |
| 5,519,418 | 5/1996 | Nishikawa et al. | 347/19 |

FOREIGN PATENT DOCUMENTS 2012213 7/1979 United Kingdom .

OTHER PUBLICATIONS

The Gravure Association of America, *The gravure Engraving Manual* (1987).

Heimann GmbH, *Drucktechnishe Beratung–Graphischer Handel* (Pamphlet, Hamm, Germany, 1984).

Heimann GmbH, *Check–Master* (Pamphlet, Date Unknown).

Ahauser Tiefdruck–Gravuren GmbH & Co., *Engraving Tester ET2000* (Pamphlet, Date Unknown).

Promatec Graphique, *M2B2 modele depose Micro Surface Sarl* (Pamphlet, Antony, France, 1987).

*VIP–Video–Image–Processing* (Pamphlet, Author unkown, date unkown).

"How much flexo or gravure ink do you need?", author unknown, pp. 20–21 (Jan., 1973).

*Primary Examiner*—Eric Frahm
*Attorney, Agent, or Firm*—Jacox, Meckstroth & Jenkins

[57] ABSTRACT

A system and method relates to an ink volume determination for determining the amount of ink to be applied by the printer. The ink volume determination involves generating a composite cylinder layout of at least one image for the engraved cylinder, generating a set of data corresponding to the composite cylinder layout and then using the set of data to determine the volume of ink. The printer is then filled with a volume of ink related to this calculated ink volume during a printing process. The method of determining ink volume may be used independently of the printing process, for example, in order to control or manage the amount of ink used in the printing press.

83 Claims, 8 Drawing Sheets

METHOD FOR PREDICTING INK CONSUMPTION

Matter enclosed in heavy brackets [ ] appears in the original patent but forms no part of this reissue specification; matter printed in italics indicates the additions made by reissue.

BACKGROUND OF THE INVENTION

This invention relates to a method of predicting ink consumption in a gravure printing process. Such a process may use an electro-mechanically engraved gravure printing cylinder; for example, a gravure printing cylinder which has been engraved in accordance with the method disclosed in [copending] application, Ser. No. 08/022,127, filed Feb. 25, 1993, *and now issued as U.S. Pat. No. 5,424,845*. Such printing cylinders are engraved by an engraving head comprising a diamond stylus carried by a holder mounted on an arm projecting from a torsionally oscillated shaft. A sine wave driving signal is applied to a pair of opposed electromagnets to rotate the shaft through an arc of approximately 0.25° at a frequency in the neighborhood of about 3,000 to 5,000 Hz.

A video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the printing surface of the printing cylinder. The system has setup controls for quickly and easily setting up the engraving head to engrave cells of precisely controlled dimensions in the surface of a gravure printing cylinder.

When such a printing cylinder is used in a gravure printing process, ink will be applied in an amount which is related to the total volume of all of the cells which have been so engraved. This is likewise true for gravure printing processes using printing cylinders which have been engraved by other engraving techniques. Regardless of the particular engraving technique which is used, it has been common lo engrave connecting channels between cells having a depth which is greater than some predetermined amount. This has complicated the task of predicting the amount of ink which will be required for a particular printing job. Heretofore, ink volume estimation has required a tedious trial and error process and has been subject to error. This has made it necessary to stock excess amounts of ink in order to avoid shortages.

SUMMARY OF THE INVENTION

It is, therefore, a primary object of this invention to provide an ink management system which permits the efficient management of ink.

In one aspect, this invention comprises a method for determining a volume of ink for an engraved cylinder, said method comprising the steps of: (a) generating a composite cylinder layout of at least one image for said engraved cylinder; (b) generating a set of data corresponding to said composite cylinder layout; and (c) using said set of data to determine said volume of ink.

An object of this invention is to provide a system or method for determining a volume of ink for an engraved cylinder.

Another object of this invention is to provide a system or method of determining said ink volume in response to at least one input parameter, such as cell width, cell wall size, channel width, engraving width, taper requirements, circumferential linearization, balance correction, edge enhancement level, screen and screen angle.

Still another object is to provide a system or method for determining the amount of ink consumed by an engraved cylinder during printing.

These advantages and others may be more readily understood in connection with the following specification, claims and drawing.

DESCRIPTION OF THE PREFERRED EMBODIMENTS

Figure 1:
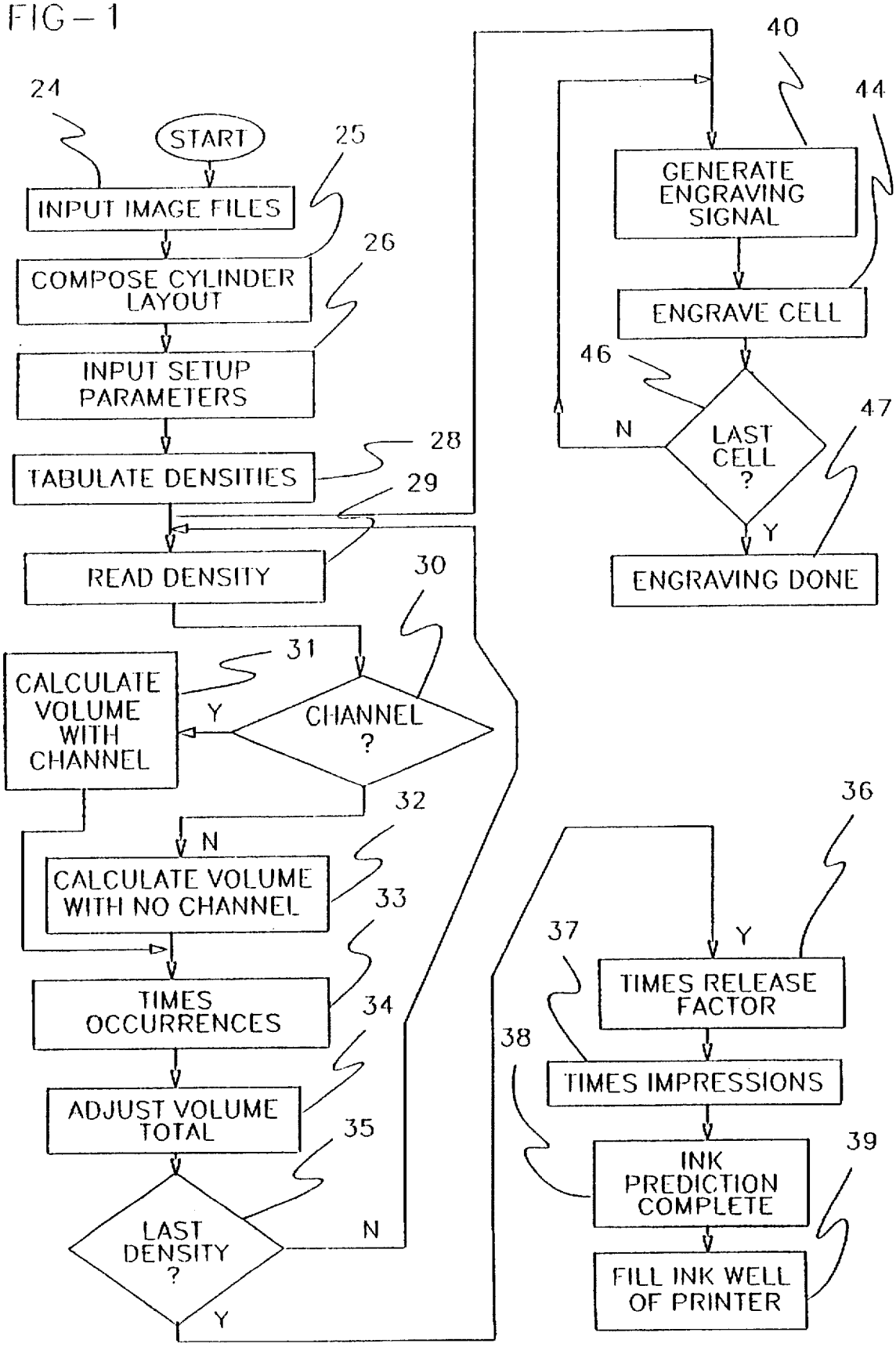
FIG. 1 is a general schematic view of the system and method according to an embodiment of this invention.

A method of predicting ink consumption in accordance with the present invention utilizes a series of steps as illustrated generally in FIG. 1. The object is to print N copies of an original image or of a composite image comprised of multiple images. The data defining an original or composite image may be generated and downloaded from a computer or it could be scanned, for example, from a graphic master or other medium capable of being scanned.

The method of the invention begins by inputting the image data as indicated by block 24 of FIG. 1. The image data could be a group of files representing multiple images, each obtained from a different source. Alternatively, the images could be a single file of scanned or computer generated image data.

After the files of image data have been read, a composite cylinder layout (block 25) is composed. This cylinder layout identifies the portion of each image which is to be engraved on the cylinder surface and specifies the exact geometric placement of that portion of each image. In order to compose the composite cylinder layout, one or more of a plurality of engraving parameters (not shown) may be input into the computer. For example, the parameters of engraving width, taper requirements, circumferential linearization, balance correction, edge enhancement level, screen and screen angle, as well as others, may be input into the computer. These parameters affect the size and placement of engraved cells on the cylinder. For example, taper and circumferential linearization adjust engraved cells to eliminate visual discontinuities caused by spiral engraving. The edge enhancement level parameters provide a method to improve contrast at line or image edges. The screen and screen angle generally describe cell population and cell shape.

The computer comprises means for considering each of the above parameters, as well as others, and for adjusting the densities of certain cells accordingly.

After the cylinder layout and engraving parameters are specified, cell shape parameters are input (block 26) which complete the definition of an engrave job. A histogram representing the image densities of each of the pixels may then be generated for the engrave job. Density values for a conventional electronic engraving machine are generally proportional lo the voltages supplied to the engraving head. As discussed in detail below, an electronic engraving machine is driven by a video signal and an AC signal. The video signal is generally adjusted so as to be proportional to a desired printing density. The density values used to compile the histogram are used for the engraving operation, as well as used to predict ink volume.

In block 28, the computer prepares a table of data representing a histogram of density values associated with the composite cylinder layout. Preferably the densities are digitized and set to one or another of a predetermined number of discrete values. A vector of length 1025 has been found to be convenient for this purpose. Each time the examination indicates a particular density value, the appropriate vector position is adjusted. This process continues until a histogram or table of densities is generated for the entire cylinder.

After the density table has been generated, the computer begins reading the tabulated density values (block 29) for calculation of associated cell volumes. Calculations are performed at blocks 31 and 32 to determine the volumes of each of the different cell sizes corresponding to the different density levels. Each computed cell volume is multiplied by the number of occurrences of that cell volume to obtain a cell volume subtotal (block 33). The subtotals are accumulated (for example, at block 34) in order to read the total volume of all engraved cells.

Figure 5:
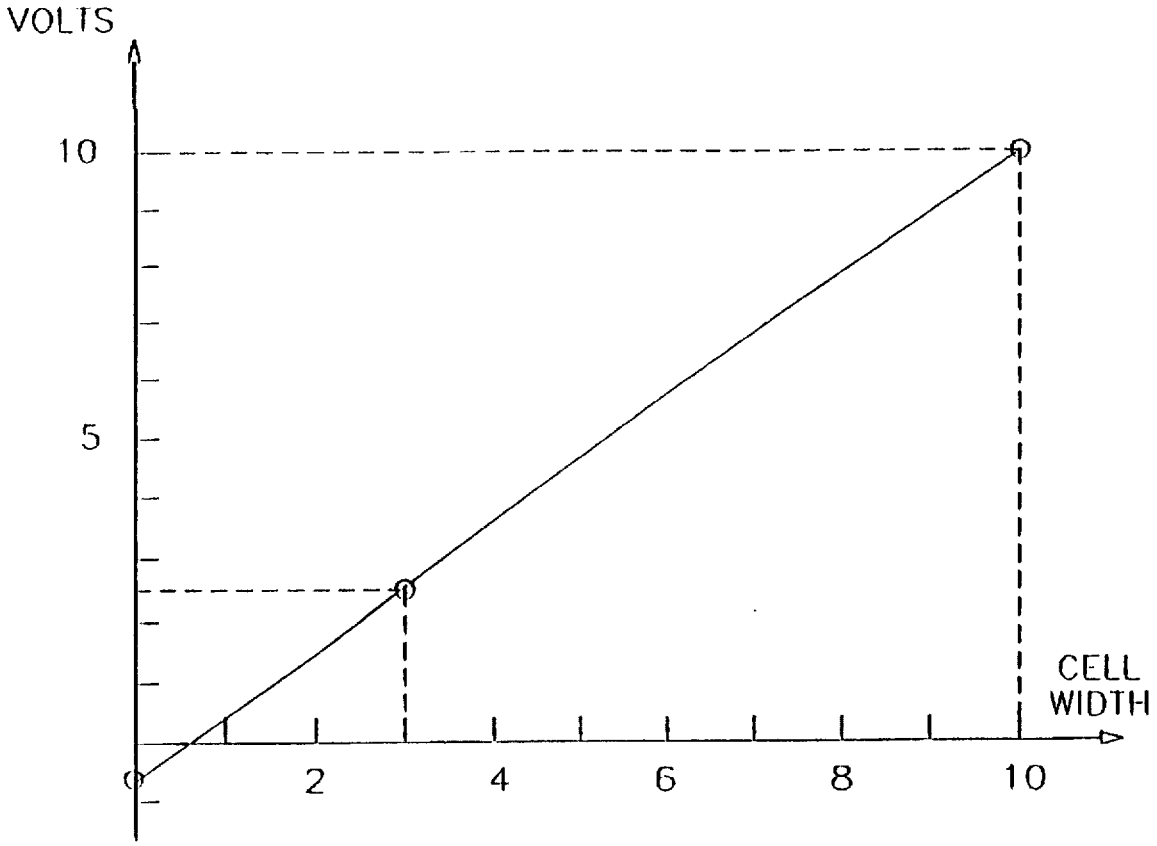
FIG. 5 is a graph showing the relationship between a voltage supplied to the engraving head and the cell width.

The cell volume calculations use the setup parameters generated at block 26 to define the cell shape and geometry. These same parameters are used for controlling the engraving process (blocks 40–47) substantially as shown and describe in [Ser. No. 08/022,127] *U.S. Pat. No. 5,424,845* which is assigned to the same assignee as the present invention and which is herein incorporated by reference and made a part hereof. In short, a highlight voltage and cell width, a shadow voltage and cell width and a stylus angle are selected and input by the operator. The voltage and cell width corresponding to a shadow cell and a highlight cell may define a linear or non-linear function. In the embodiment being described, the voltage and cell width define a generally linear function, as shown in FIG. 5. Thus, given the voltage, for example, of a shadow cell, the computer determines the width of that shadow cell.

Figure 2:
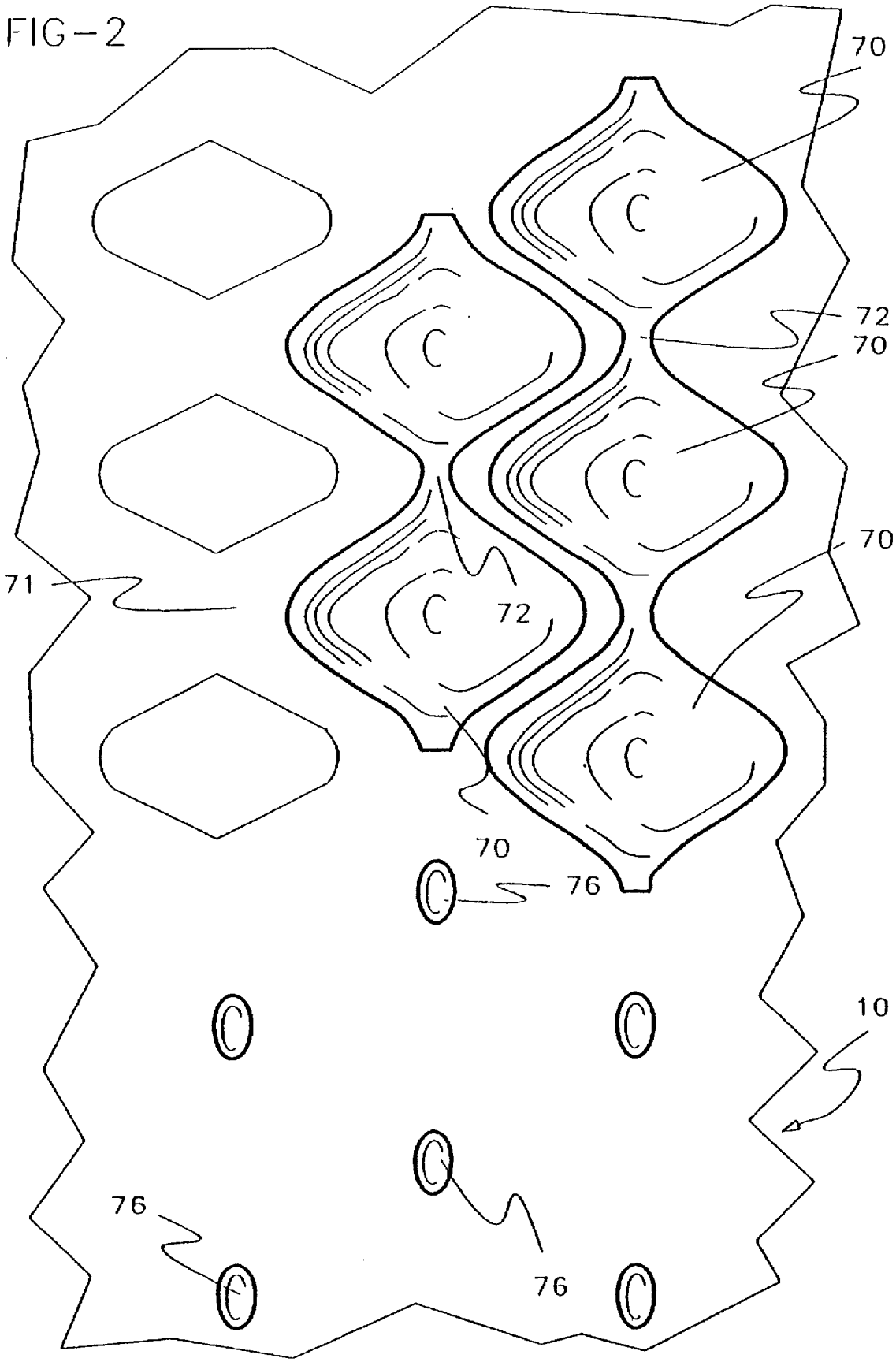
FIG. 2 is a fragmentary view of a cylinder surface showing a plurality of cells, cell walls and highlight cells.

A series of engraved shadow cells 70 and highlight cells 76 may be engraved on the surface of a cylinder 10 as generally illustrated in FIG. 2. Shadow cells 70 may be connected by channels 72, the width of which may be adjusted by adjusting the video signal used for driving the engraving tool. If the shadow cells are not connected by a channel, the distance between cells in the direction of engraving is the vertical cell spacing 71, as shown in FIG. 2.

Figure 3:
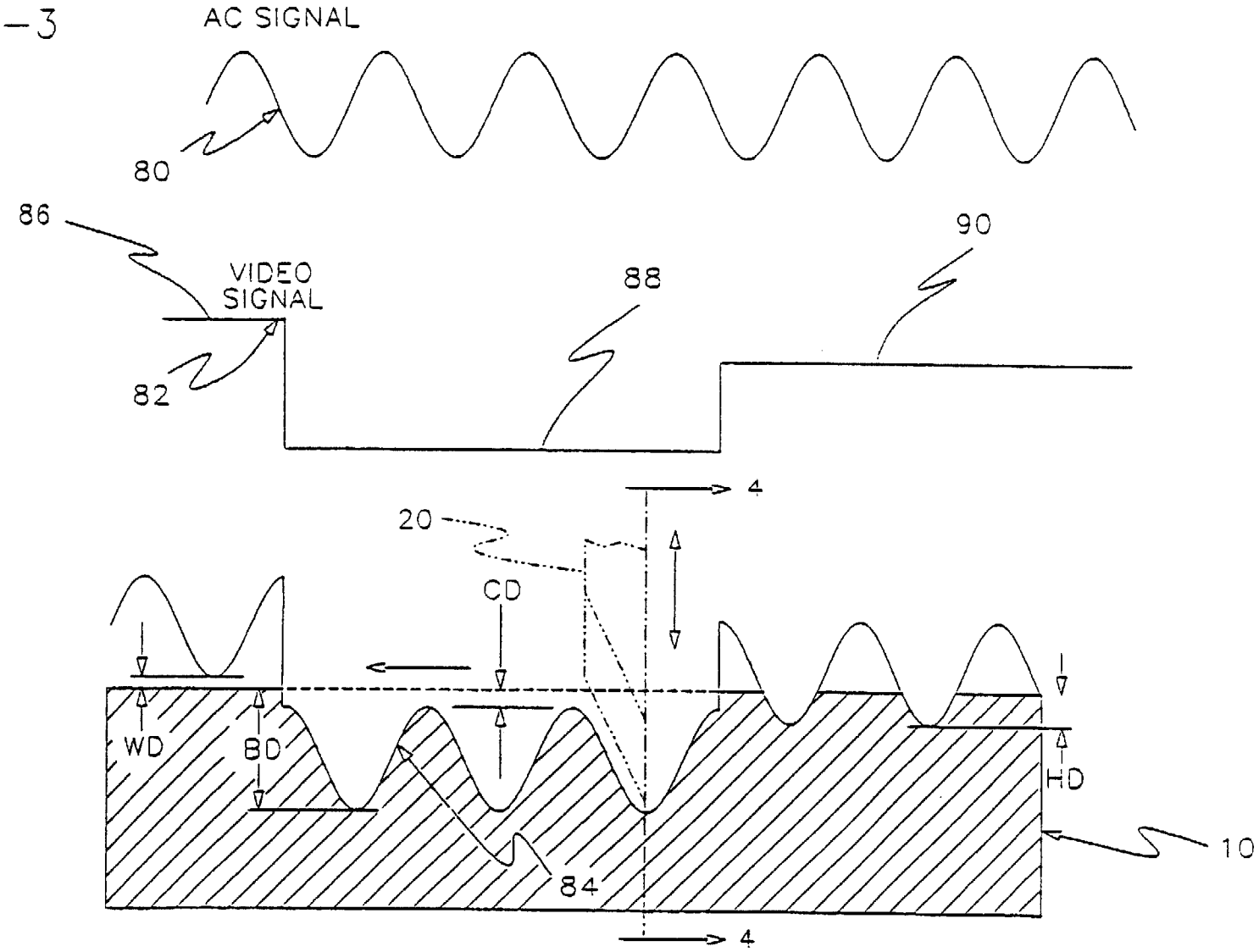
FIG. 3 is a schematic illustration of AC and DC signals for controlling an engraving stylus on an engraving head of an engraver and the engraving movement which results therefrom.

Referring now to FIG. 3, an engraving tool 20 oscillates into cutting contact with cylinder 10 under control of a driving signal which is the sum of a video signal 82 and an AC signal 80. Video signal 82 may have a white level value 86 such that the tip of the engraving tool never gets closer to cylinder 10 than a predetermined white depth WD. When the video signal 82 drops to the value 88, the engraver engraves full depth shadow cells having a maximum depth BD. The tool then engraves a contour 84 having a minimum depth CD which is the channel depth. When the video signal shifts upwardly to a value 90, the engraver engraves highlight cells having a maximum depth HD. Reference may be made to [application Ser. No. 08/022,127] *U.S. Pat. No. 5,424,845* for equations which relate white depth and shadow depth voltages to a desired channel depth in a desired highlight depth.

Figure 6:
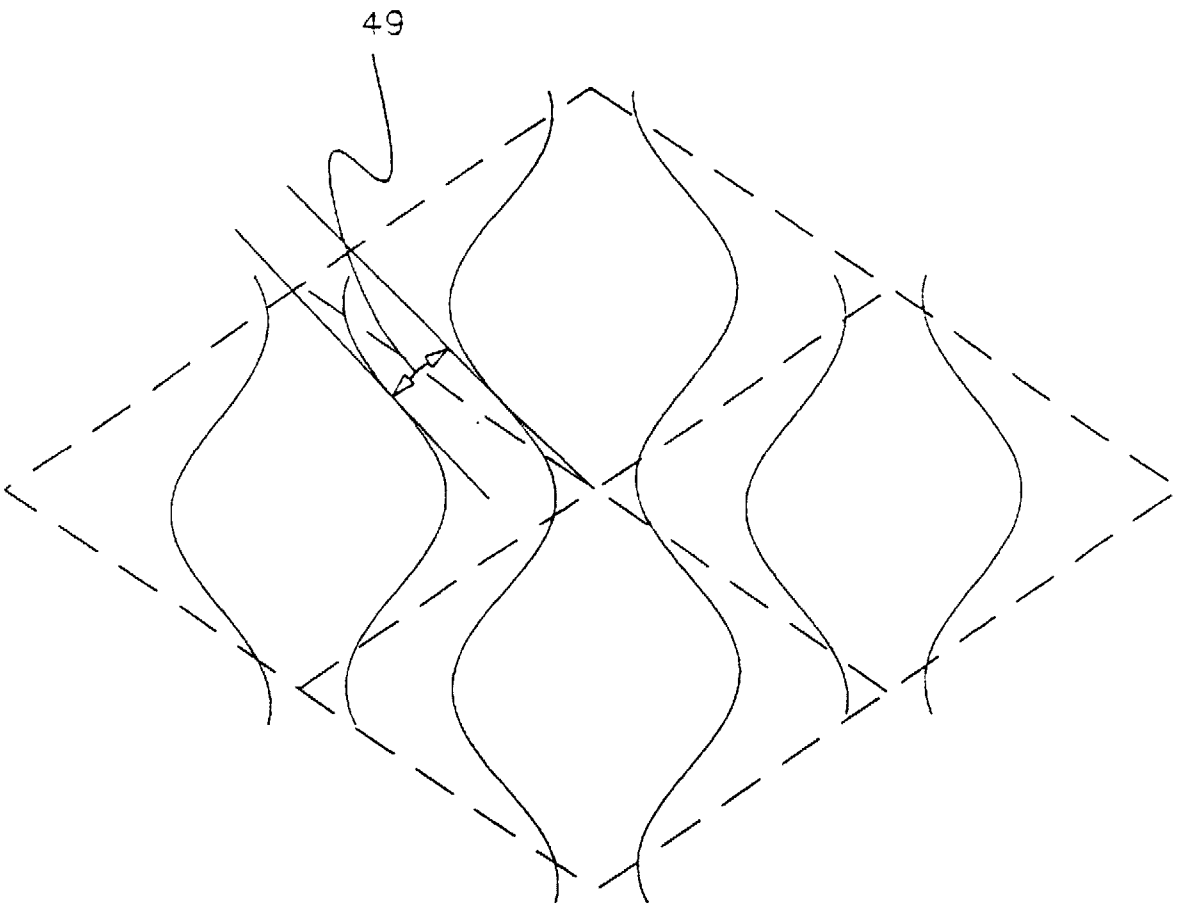
FIG. 6 is a fragmentary view showing a cell wall width.

The preferred embodiment of this invention utilizes a minimum diagonal wall size 49 (FIG. 6) as a setup parameter. The minimum diagonal wall size 49 is the perpendicular distance between tangent lines to adjacent cell walls.

The cell shape description mentioned above may be fine tuned if desired. For example, the channel width associated with a cell shape description may be entered in which case the computer recalculates or adjusts the minimum diagonal wall size 49. It is to be noted that a channel width of zero, indicating no channel, may be entered into the computer. In this event, a vertical spacing between cells may be entered into the computer, and again, the computer will recalculate or adjust the minimum diagonal wall size. Therefore, it is significant to note that the computer comprises means for tuning the cell shape description to accommodate various inputs and parameters which may affect cell shape, geometry, and volume.

All input parameters and fine tuning inputs may be shown on a monitor (not shown) which is operatively coupled to the computer.

The volumes of the individual cell types are calculated by a process indicated by decision point 30 and blocks 31 and 32. The process involves calculating the cross-sectional area of the cell as a function of cell location (e.g. position along the cell) and then integrating the area along the length of the cell in the direction of the engraving track. The integration may be carried out in closed form (as defined by the equations below) or performed numerically. If the integration is carried out numerically, then a check is made immediately following each pass through the integration loop to determine whether integration of the cell has been completed.

In the preferred embodiment, the volume for a cell is determined using one or the other of equations (1) and (2) below. It is to be noted that the cell volume will differ for a cell with a channel as opposed to a cell without a channel.

The volume of a cell with a channel is given by the equation:

$$\text{Volume/cell} = \frac{P \tan\frac{\theta}{2}}{8} \{3D_1^2 + 2D_0D_1 + 3D_0^2\} \tag{1}$$

$$b = \frac{1}{s}.$$

$\theta$ is the stylus tip angle.

s is screen in lines/micron.

b is the length of the side of a normal cell in microns.

$$P = \sqrt{2 \tan\phi}\ b$$

P is the period of the sine wave mentioned earlier herein.

$\phi$ is the screen angle.

$D_0$=depth of channel in microns.

$D_1$=total depth the stylus travels into copper.

Figure 7:
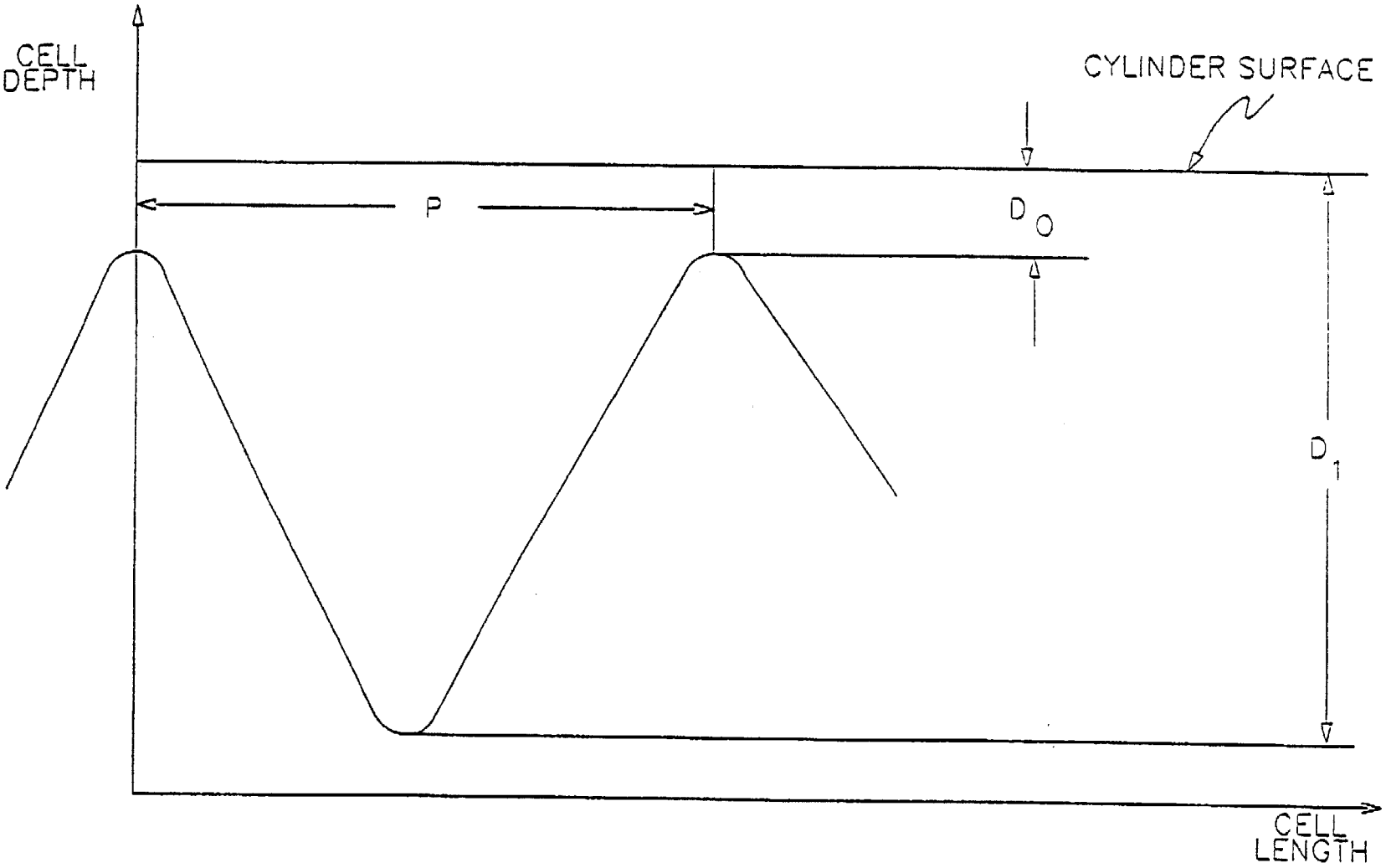
FIG. 7 is a graph showing the relationship between the length and the depth of a cell with a channel.

For ease of illustration, FIG. 7 graphically illustrates the variables P, $D_0$, and $D_1$ for a cell with a channel.

The volume of a cell without a channel is given by the equation:

$$\text{Volume/cell} = \frac{\tan\frac{\theta}{2}}{2}\left[\frac{3D_1^2 - 2D_0D_1 + 3D_0^2}{4} L + (D_1^2 - D_0^2)\frac{P}{\pi}\sin\left(\frac{L}{P}\pi\right) + (D_1 + D_0)^2\frac{P}{8\pi}\sin\left(\frac{L}{P}2\pi\right)\right] \quad (2)$$

b, s, θ and P are as defined above.

$$L = \frac{2P}{\pi}\tan^{-1}\left(\sqrt{\frac{D_1}{D_0}}\right)$$

L is the cell length in direction of cutting.

$D_1$ is the depth of the cell, $D_0$ is the amplitude of the sine wave (to be derived from user inputs) minus the depth of the cell.

Figure 8:
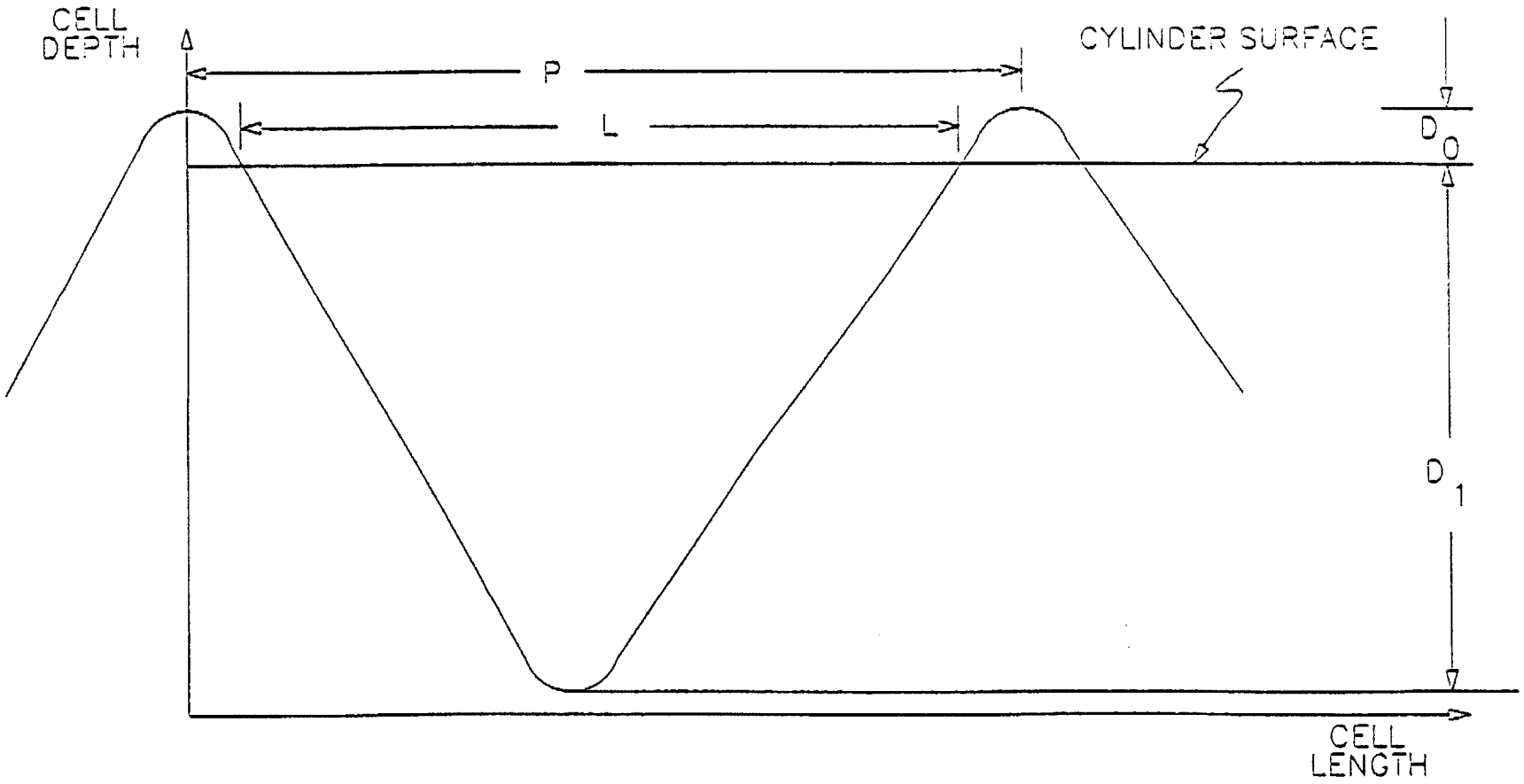
FIG. 8 is a graph showing the relationship between the length and the depth of a cell without a channel.

For ease of illustration, FIG. 8 graphically illustrates the variables P, L, $D_0$ and $D_1$ for a cell without a channel.

After integration of the first cell size has been completed, the process proceeds to select the next cell size and repeats the integration process. After completion of each volume computation, a check is made (Point 35) to determine whether the volumes of all cell sizes have been determined. If so, then the process proceeds to block 36 for a calculation of the volume of ink required for a single impression. Here, the total computed cell volume is multiplied by a release factor R. The release factor accounts for factors, such as the absorption properties of the printing substrate, the viscosity of the ink, speed of the press and the like. This ink volume is multiplied by the number of impressions N (block 37) to obtain the required volume of ink for an entire press run. This completes the prediction of ink consumption and usage at block 38. In the embodiment being described, the ink volume may then be used to provide an estimate of the amount of ink to fill an ink well of the printer (block 39).

If the integration is carried out numerically, then it is most convenient to perform the integration over a one-half wavelength distance and thereafter double the result. The numerical integration proceeds by moving from station-to-station along a profile of FIG. 3 and calculating the cross-sectional area at each station. This area is multiplied by the incremental distance between computing positions to obtain an incremental volume.

Figure 4:
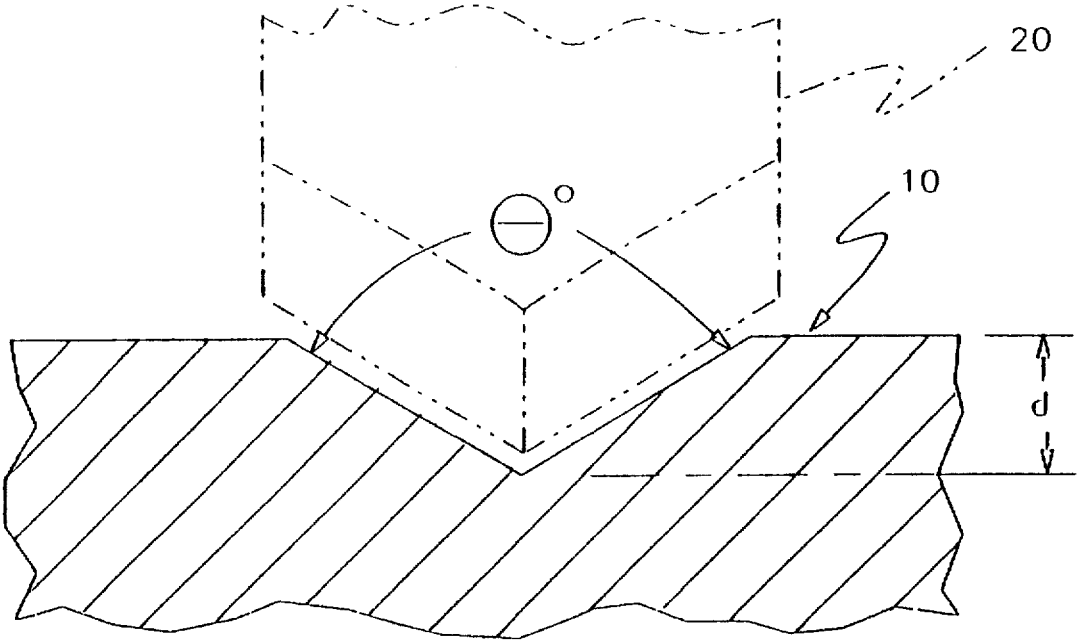
FIG. 4 is a fragmentary view of the cylinder showing an engraving stylus and associated angle cut into the cylinder.

A typical stylus 20 for use in the practice of this invention is illustrated in phantom outline in FIGS. 3 and 4. The tip of stylus 20 has two bevelled faces which produce a tip angle θ, which may be about 120°. The stylus cuts a corresponding angular channel in the surface. It will be appreciated that FIG. 4 is a view taken perpendicular to the view of FIG. 3. Thus, the walls have a sinusoidal profile when viewed in a direction perpendicular to the engraving direction and conform to the shape of the engraving tip when viewed in a direction parallel to the direction of engraving.

Each of the depressions illustrated in FIG. 3 represents an engraved printing cell. Thus the Figure depicts three deep printing cells interconnected by two channels and two shallower printing cells which are not connected to any other cell. The volume of any printing cell may be computed by calculating the cross-sectional area as viewed in FIG. 4 and integrating that area over a one wavelength distance in the direction of engraving (e.g. parallel to engraving tracks 30).

In the special case where stylus 20 has a tip configuration as illustrated in FIGS. 3 and 4, the cross-sectional area of the cut is given by the expression:

$$S = d^2 * \tan(\theta/2)$$

The wavelength distance is given by the period of the sine wave as defined above. At each computing interval, it is necessary to check the sign of d to assure that it has a positive value. Whenever d is found to have a negative value, the computer forces it to a value of zero.

Advantageously, this invention provides an ink management system and printing method for precisely determining the amount of ink required by a print cylinder, such as a gravure cylinder having a plurality of cells.

It is to be noted that the video data generated at block 28 may be applied to an engraving controller (not shown) for generation of an engraving signal at block 40. This engraving signal is used to position an engraving stylus, as described in detail below. The engraving stylus engraves a cell (block 44) and continues engraving cells until the last cell has been engraved (decision point 46).

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended.

What is claimed is:

1. A method for determining a volume of ink for an engraved cylinder, said method comprising the steps of:

(a) generating a composite cylinder layout of at least one image for said engraved cylinder;

(b) generating a set of data corresponding to said composite cylinder layout; and (c) using said set of data *and at least one engraving parameter* to determine said volume of ink.

2. The method as recited in claim 1 wherein said generating step (a) further comprises the steps of:

(a)(i) inputting said at least one image into a processor;

(a)(ii) composing said composite cylinder layout of said at least one image using said processor.

3. The method as recited in claim 1 wherein said composite cylinder layout comprises a plurality of images; said generating step (a) further comprising the steps of:

(a)(i) inputting said plurality of images into a processor;

(a)(ii) composing said composite cylinder layout of said plurality of images using said processor.

4. [The method as recited in claim 2 wherein] *A method for determining a volume of ink for an engraved cylinder, said method comprising the steps of:*

*(a) generating a composite cylinder layout of at least one image for said engraved cylinder;*

*(b) generating a set of data corresponding to said composite cylinder layout; and*

*(c) using said set of data to determine said volume of ink; said generating step (a) further comprising the steps of:*

*(a)(i) inputting said at least one image into a processor;*

*(a)(ii) composing said composite cylinder layout of said at least one image using said processor;* said step (a)(i) further [comprises] *comprising* the step of:

(a)(i)(1) inputting at least one engraving parameter.

5. The method as recited in claim 4 wherein said at least one engraving parameter comprises at least one of the following: engraving width, taper, circumferential linearization, balance correction, edge enhancement, density threshold levels, fast forward, screen, and screen angle.

6. [The method as recited in claim 1 wherein] *A method for determining a volume of ink for an engraved cylinder, said method comprising the steps of:*

(*a*) *generating a composite cylinder layout of at least one image for said engraved cylinder;*

(*b*) *generating a set of data corresponding to said composite cylinder layout; and*

(*c*) *using said set of data to determine said volume of ink;* said step (a) further [comprises] *comprising* the step of:

(a)(i) generating a histogram corresponding to densities associated with at least a portion of [the] engraved cells on said engraved cylinder.

7. [The method as recited in claim 1 wherein] *A method for determining a volume of ink for an engraved cylinder, said method comprising the steps of:*

(*a*) *generating a composite cylinder layout of at least one image for said engraved cylinder;*

(*b*) *generating a set of data corresponding to said composite cylinder layout; and*

(*c*) *using said set of data to determine said volume of ink;* said step (b) further [comprises] *comprising* the step of:

(b)(i) determining a cell description using call shape parameters.

8. The method as recited in claim 5 wherein said step (a) further comprises the step of:

(a)(i) generating a histogram corresponding to densities associated with at least a portion of engraved cells on said engraved cylinder.

9. The method as recited in claim 7 wherein said cell shape parameters comprise at least one of the following: channel width, highlight cell width, wall size, vertical spacing, channel voltage, highlight voltage, shadow voltage, shadow cell width, and stylus angle.

10. [The method as recited in claim 1 wherein said method further comprises the step of:] *A method for determining a volume of ink for an engraved cylinder, said method comprising the steps of:*

(*a*) *generating a composite cylinder layout of at least one image for said engraved cylinder;*

(*b*) *generating a set of data corresponding to said composite cylinder layout;*

(*c*) *using said set of data to determine said volume of ink; and*

(d) determining an amount of ink to be used when making a number of copies, said determining step further comprising the steps of:

inputting a release factor into a processor;

inputting said number of copies into said processor.

11. The method as recited in claim 7 wherein said step (b) further comprises the step of:

tuning said cell description in consideration of whether said cell description comprises a channel.

12. The method as recited in claim 7 wherein said step (b) further comprises the step of:

inputting a minimum diagonal wall size into a processor.

13. The method as recited in claim 7 wherein said step (b) further comprises the step of:

inputting a vertical cell spacing into a processor.

14. [The method as recited in claim 1 wherein] *A method for determining a volume of ink for an engraved cylinder, said method comprising the steps of:*

(*a*) *generating a composite cylinder layout of at least one image for said engraved cylinder;*

(*b*) *generating a set of data corresponding to said composite cylinder layout; and*

(*c*) *using said set of data to determine said volume of ink;* said step (c) further [comprises] *comprising* the step of:

(c)(i) using the following equation to determine said ink volume if a cell description comprises a channel:

$$\text{Volume/cell} = \frac{P \tan\frac{\theta}{2}}{8} \{3D_1^2 + 2D_0D_1 + 3D_0^2\}$$

$$b = \frac{1}{s};$$

θ is a stylus tip angle;

s is screen in lines/micron;

b is a length of a side of a normal cell in microns;

$$P = \sqrt{2 \tan\Phi}\ b;$$

P is the period of the sine wave;

ϕ is a screen angle;

$D_0$=depth of channel in microns; and $D_1$=total depth a stylus travels into copper.

15. [The method as recited in claim 1 wherein] *A method for determining a volume of ink for an engraved cylinder, said method comprising the steps of:*

(*a*) *generating a composite cylinder layout of at least one image for said engraved cylinder;*

(*b*) *generating a set of data corresponding to said composite cylinder layout; and*

(*c*) *using said set of data to determine said volume of ink;* said step (c) further [comprises] *comprising* the step of:

(c)(i) using the following equation to determine said ink volume if a cell description does not comprise a channel:

$$\text{Volume/cell} = \frac{\tan\frac{\theta}{2}}{2} \left[ \frac{3D_1^2 - 2D_0D_1 + 3D_0^2}{4} L + (D_1^2 - D_0^2)\frac{P}{\pi} \sin\left(\frac{L}{P}\pi\right) + (D_1 + D_0)^2 \frac{P}{8\pi} \sin\left(\frac{L}{P} 2\pi\right) \right]$$

$$b = \frac{1}{s},$$

θ is a stylus tip angle;

s is screen in lines/micron;

b is a length of the side of a normal cell in microns;

$$P = \sqrt{2 \tan\Phi}\ b;$$

P is the period of the sine wave; *herein;*

$$L = \frac{2P}{\pi} \tan^{-1}\left(\sqrt{\frac{D_1}{D_0}}\right);$$

ϕ is a screen angle;

L is a cell length in direction of cutting;

$D_1$ is a depth of a cell; and $D_0$ is an amplitude of a sine wave (to be derived from user inputs) minus the depth of the cell.

16. The method as recited in claim 1 wherein said method further comprises the step of:

applying said volume of ink from said engraved cylinder to a substrate.

17. A method for predicting ink usage by an engraved cylinder on a printing press during a printing process, said method comprising the steps of:

(a) determining ink volume required by at least a portion of the engraved cylinder during the printing process; and (b) supplying a quantity of ink to the printing press [in an amount corresponding to said ink volume];

said determining step further comprising the steps of:

generating a composite cylinder layout of at least one image for said engraved cylinder;

generating a set of data corresponding to said composite cylinder layout *without simultaneously rotatably scanning said at least one image*; and using said set of data to determine a volume of ink used by said engraved cylinder during said printing process.

18. A method for predicting ink usage by an engraved cylinder on a printing press during a printing process, said printing press comprising an ink well, said method comprising the steps of:

(a) determining ink volume required by at least a portion of the engraved cylinder [during the printing process]; *using at least one input parameter and without simultaneously rotatably scanning an input image corresponding to said portion of the engraved cylinder*;

(b) supplying a quantity of ink to the printing press in an amount corresponding to said ink volume; and (c) filling said ink well with said quantity of ink.

19. The method as recited in claim 17 wherein said [generating step (a)] *method* further comprises the steps of:

(a)(i) inputting said at least one image into a processor;

(a)(ii) composing said composite cylinder layout of said at least one image using said processor.

20. A method for predicting ink usage by an engraved cylinder on a printing press during a printing process, said method comprising the steps of:

(a) determining ink volume required by at least a portion of the engraved cylinder during the printing process; and (b) supplying a quantity of ink to the printing press in an amount corresponding to said ink volume; [ps]

said step [(a)(i)] (*a*)further comprises the step of:

[(a)(i)(1)] (*a*)(*i*)inputting at least one engraving parameter.

21. The method as recited in claim 20 wherein said at least one engraving parameter comprises at least one of the following: engraving width, taper, circumferential linearization, balance correction, edge enhancement, density threshold levels, fast forward, screen, and screen angle.

22. A method for predicting ink usage by an engraved cylinder on a printing press during a printing process, said method comprising the steps of:

(a) determining ink volume required by at least a portion of the engraved cylinder during the printing process; and (b) supplying a quantity of ink to the printing press in an amount corresponding to said ink volume;

said step (a) further comprising the step of:

(a)(i) generating a histogram corresponding to densities associated with at least a portion of cells on said engraved cylinder.

23. A method for predicting ink usage by an engraved cylinder on a printing press during a printing process, said method comprising the steps of:

(a) determining ink volume required by at least a portion of the engraved cylinder during the printing process; and (b) supplying a quantity of ink to the printing press in an amount corresponding to said ink volume;

said [step (b)] *method* further comprises the step of:

(b)(i) determining a cell description using cell shape parameters.

24. The method as recited in claim 23 wherein said cell shape parameters comprise at least one or the following: channel width, highlight cell width, wall size, vertical spacing, channel voltage, highlight voltage, shadow voltage, shadow cell width, and stylus angle.

25. The method as recited in claim 23 wherein said step (b) further comprises the step of:

tuning said cell description in consideration of whether said cell description comprises a channel.

26. The method as recited in claim 23 wherein said method further comprises the step of:

inputting a minimum diagonal wall size.

27. The method as recited [n] *in* claim 23 wherein said method further comprises the step of:

inputting a vertical cell spacing.

28. The method as recited in claim 17 wherein said method further comprises the step of:

using the following equation to determine said ink volume if a cell description comprises a channel:

$$\text{Volume/cell} = \frac{P \tan\frac{\theta}{2}}{8} \{3D_1^2 + 2D_0D_1 + 3D_0^2\}$$

$$b = \frac{1}{s}.$$

θ is a stylus tip angle;

s is screen in lines/micron;

b is a length of a side of a normal cell in microns;

$$P = \sqrt{2 \tan\phi}\ b:$$

P is a period or a sine wave;

φ is a screen angle;

$D_0$=depth of channel in microns; and $D_1$=total depth a stylus travels into copper.

29. A method as recited in claim 17 wherein said using step further comprises the step of:

using the following equation to determine said ink volume if [said] *a* cell description does not comprise a channel:

$$\text{Volume/cell} = \frac{\tan\frac{\theta}{2}}{2}\left[\frac{3D_1^2 - 2D_0D_1 + 3D_0^2}{4} L + (D_1^2 - D_0^2)\frac{P}{\pi}\sin\left(\frac{L}{P}\pi\right) + (D_1 + D_0)^2\frac{P}{8\pi}\sin\left(\frac{L}{P}2\pi\right)\right]$$

$$b = \frac{1}{s}.$$

θ is a stylus lip angle;

s is screen in lines/micron;

b is a length of a side of a normal cell in microns;

$$P=\sqrt{2\tan\phi}\ b:$$

P is a period of [the] *a* sine wave;

$$L=\frac{2P}{\pi}\tan^{-1}\left(\sqrt{\frac{D_1}{D_0}}\right);$$

L is a cell length in direction of cutting;

$D_1$ is a depth of a cell; and $D_0$ is a amplitude of a sine wave (to be derived from user inputs) minus the depth of the cell.

30. A method of reproducing an image comprising the steps of:

generating an engraving signal representing densities of a series of pixels associated with said image;

rotating a printing cylinder about a cylindrical axis thereof;

oscillating an engraving tool into engraving contact with said printing cylinder, along an engraving track, concomitantly with said rotating and under control of an engraving head signal related to said engraving signal such that said engraving tool engraves into a surface of said printing cylinder a series or cells along said engraving track and corresponding to said pixels, each of said series of cells having a maximum depth corresponding to a density or its associated pixels;

activating a processor to determine a cross-sectional area or any of said series of cells at any cell location along a line extending in a direction along said engraving track;

causing said processor to calculate a total volume of all of said cells by integrating said cross-sectional area along a length of said engraving track;

mounting said printing cylinder on a printing press;

applying ink to said printing cylinder in an amount given by an equation:

$$A=VRN$$

where A=total amount of ink

V=calculated total cell volume

R=ink release factor

N=number of copies to be printed; and using said printing cylinder to print N copies of said image.

31. The method as recited in claim 30 wherein V is determined by the steps of:

(a) generating a composite cylinder layout of at least one image for said engraved cylinder;

(b) generating a set of data corresponding to said composite cylinder layout; and (c) using said set of data to determine said volume of ink.

32. The method as recited in claim 31 wherein said generating step (a) further comprises the steps of:

(a)(i) inputting said at least one image into said processor;

(a)(ii) composing said composite cylinder layout of said at least one image using said processor.

33. The method as recited in claim 32 wherein said step (a)(i) further comprises the step of:

(a)(i)(1) inputting at least one engraving parameter.

34. The method as recited in claim 33 wherein said engraving parameter comprises at least one of the following: engraving width, taper, circumferential linearization, balance correction, edge enhancement, density threshold levels, fast forward, screen, and screen angle.

35. The method as recited in claim 34 wherein said step (b) further comprises the step of:

(b)(i) determining a cell description using cell shape parameters.

36. The method as recited in claim 35 wherein said cell shape parameters comprise at least one of the following: channel width, highlight cell width, wall size, vertical spacing, channel voltage, highlight voltage, shadow voltage, shadow cell width, and stylus angle.

37. The method as recited in claim 36 wherein said step (b) further comprises the step of:

tuning said cell description in consideration of whether said cell description comprises a channel.

38. The method as recited in claim 35 wherein said method further comprises the steps of:

inputting a minimum diagonal wall size into said processor.

39. The method as recited in claim 35 wherein said method further comprises the steps of:

inputting a vertical cell spacing into said processor.

40. The method as recited in claim 31 wherein said step (c) further comprises the step of:

(c)(i) using the following equation to determine said ink volume if a cell description comprises a channel:

$$\text{Volume/cell}=\frac{P\tan\frac{\theta}{2}}{8}\{3D_1^2+2D_0D_1+3D_0^2\}$$

$$b=\frac{1}{s}.$$

θ is a stylus tip angle;

s is screen in lines/micron;

b is a length of a side of a normal cell in microns;

$$P=\sqrt{2\tan\phi}\ b:$$

P is a period of a sine wave;

φ is a screen angle;

$D_0$=depth of channel in microns; and $D_1$=total depth a stylus travels into copper.

41. The method as recited in claim 31 wherein said step (c) further comprises the step of:

(c)(i) using the following equation to determine said ink volume if a cell description does not comprise a channel:

$$\text{Volume/cell}=\frac{\tan\frac{\theta}{2}}{2}\left[\frac{3D_1^2-2D_0D_1+3D_0^2}{4}L+(D_1^2-D_0^2)\frac{P}{\pi}\sin\left(\frac{L}{P}\pi\right)+(D_1+D_0)^2\frac{P}{8\pi}\sin\left(\frac{L}{P}2\pi\right)\right]$$

$$b=\frac{1}{s},$$

θ is a stylus tip angle;

s is screen in lines/micron;

b is a length of a side of a normal cell in microns;

$$P = \sqrt{2 \tan\Phi}\ b;$$

P is a period of [the] *a* sine wave; *mentioned earlier herein;*

$\phi$ is a screen angle;

$$L = \frac{2P}{\pi} \tan^{-1}\left(\sqrt{\frac{D_1}{D_0}}\right);$$

L is the cell length in direction of cutting;

$D_1$ is a depth of a cell; and $D_0$ is [a] *an* amplitude of a sine wave (to be derived from user inputs) minus the depth of the cell.

42. A printing system comprising:

a printer having an ink well;

an engraved cylinder rotatably mounted on said printer, said engraved cylinder having a plurality of cells thereon;

a computer;

means located in said computer for determining an ink volume required by at least a portion of the engraved cylinder during a printing process *and without simultaneously rotatably scanning an input image corresponding to said portion of the engraved cylinder*;

said means comprising generating means for generating a set of data corresponding to a composite cylinder layout which is input into said computer and also for using said set of data *and at least one input parameter* to determine said ink volume in order to manage ink filled in said ink well.

43. The printing system as recited in claim 42 wherein said generating means further comprises receiving means for receiving at least one input parameter, said input parameter comprising at least one of the following: engraving width, taper, circumferential linearization, balance correction, edge enhancement, density threshold levels, fast forward, screen, and screen angle.

44. [The printing system as recited in claim 43 wherein] *A printing system comprising:*

*a printer having an ink well;*

*an engraved cylinder rotatably mounted on said printer, said engraved cylinder having a plurality of cells thereon;*

*a computer;*

*means located in said computer for determining an ink volume required by at least a portion of the engraved cylinder during a printing process;*

*said means comprising generating means for generating a set of data corresponding to a composite layout which is input into said computer and also for using said set of data to determine said ink volume in order to manage the ink filled in said ink well;*

*said generating means further comprises receiving means for receiving at least one input parameter, said input parameter comprising at least one of the following; engraving width, taper, circumferential linearization, balance correction, edge enhancement, density threshold levels, fast forward, screen, and screen angle;* said generating means further [comprises] *comprising* means for tabulating densities associated with each cell type and using said densities to determine said ink volume.

*45. A system for managing ink comprising:*

*input means for inputting at least one parameter associated with at least one ink-receiving area; and*

*means for receiving image data for at least a portion of an image to be engraved; for determining densities associated with said image, said densities being determined without simultaneously rotatably scanning said at least a portion of said image to be engraved; and also for using said at least one parameter and said densities for facilitating the management of ink.*

*46. The system as recited in claim 45 wherein said system further comprises:*

*means for determining an amount of ink in response to both said at least one parameter and said densities.*

*47. The system as recited in claim 46 wherein said amount of ink comprises a volume.*

*48. The method as recited in claim 46 wherein said method further comprises the step of:*

*using said at least one parameter and said densities for facilitating determining an amount of ink required by a printer.*

*49. The system as recited in claim 45 wherein said means for generating comprises:*

*a processor for composing a layout of said at least one image.*

*50. The system as recited in claim 45 wherein said generating means comprises means for generating a histogram corresponding to densities associated with at least a portion of said image.*

*51. The system as recited in claim 45 wherein said system further comprises means for determining an amount of ink to be used by a workpiece using said image data and said at least one parameter.*

*52. The system as recited in claim 51 wherein said workpiece comprises a cylinder.*

*53. A system for managing ink comprising:*

*input means for inputting at least one parameter; and*

*means for receiving image data for at least a portion of an image to be engraved; for determining densities associated with said image; and also for using said at least one parameter and said densities for facilitating the management of ink;*

*said means for receiving further comprising;*

*means for determining a cell description using cell shape parameters.*

*54. The system as recited in claim 53 wherein said system further comprises:*

*tuning means for tuning said cell description using said at least one parameter.*

*55. The system as recited in claim 54 wherein said at least one parameter comprises at least one of the following: channel width, taper, circumferential linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*56. A system for managing ink comprising:*

*input means for inputting at least one parameter; and*

*means for receiving image data for at least a portion of an image to be engraved; for determining densities associated with said image; and also for using said at least one parameter and said densities for facilitating the management of ink;*

*said at least one parameter comprising at least one of the following; channel width, taper, circumferential*

*linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*57. A system for managing ink comprising:*

*input means for inputting at least one parameter; and*

*means for receiving image data for at least a portion of an image to be engraved; for determining densities associated with said image; and also for using said at least one parameter and said densities for facilitating the management of ink;*

*said means for receiving uses the following formula to determine an amount of ink:*

$$b = \frac{l}{s},$$

*θ is a stylus tip angle;*

*s is screen in lines/micron;*

*b is a length of a side of a normal cell is microns;*

$$P = \sqrt{2 \tan\Phi}\ b;$$

*P is the period of the sine wave mentioned earlier herein;*

*ϕ is a screen angle;*

*$D_0$=depth of channel in microns; and*

*$D_1$=total depth a stylus travels into copper.*

*58. A system for managing ink comprising:*

*input means for inputting at least one parameter; and*

*means for receiving image data for at least a portion of an image to be engraved; for determining densities associated with said image; and also for using said at least one parameter and said densities for facilitating the management of ink;*

*said means for receiving uses the following formula to determine an amount of ink:*

$$Volume/cell = \frac{\tan\frac{\theta}{2}}{2}\left[\frac{3D_1^2 - 2D_0D_1 + 3D_0^2}{4} L + (D_1^2 - D_0^2)\frac{P}{\pi}\sin\left(\frac{L}{P}\pi\right) + (D_1 + D_0)^2\frac{P}{8\pi}\sin\left(\frac{L}{P}2\pi\right)\right]$$

$$b = \frac{l}{s},$$

*θ is a stylus tip angle;*

*s is screen in lines/micron;*

*b is a length of a side of a normal cell in microns;*

$$P = \sqrt{2 \tan\Phi}\ b;$$

*P is the period of the sine wave mentioned earlier herein;*

$$L = \frac{2P}{\pi}\tan^{-1}\left(\sqrt{\frac{D_1}{D_0}}\right);$$

*L is the cell length in direction of cutting;*

*$D_1$ is a depth of a cell; and*

*$D_0$ is the amplitude of a sine wave (to be derived from user inputs) minus the depth of the cell.*

*59. A method for managing ink comprising the steps of:*

*inputting at least one parameter associated with an area for receiving ink;*

*receiving image data for at least a portion of an image to be engraved without simultaneously rotatably scanning said portion of said image to be engraved;*

*determining densities associated with said image; and*

*using said at least one parameter and said densities for facilitating the management of ink.*

*60. The method as recited in claim 59 wherein said method further comprises the step of:*

*determining an amount of ink in response to both said at least one parameter and said densities.*

*61. The method as recited in claim 59 wherein said method further comprises the step of:*

*composing a layout of said at least one image.*

*62. The method as recited in claim 59 wherein said method further comprises the step of:*

*determining an amount of ink to be used by a workpiece using said image data and said at least one parameter.*

*63. The method as recited in claim 62 wherein said workpiece comprises a cylinder.*

*64. A method for managing ink comprising the steps of:*

*inputting at least one parameter;*

*receiving image data for at least a portion of an image to be engraved;*

*determining densities associated with said image;*

*using said at least one parameter and said densities for facilitating the management of ink; and*

*generating a histogram corresponding to densities associated with said at least a portion of said image.*

*65. A method for managing ink comprising the steps of:*

*inputting at least one parameter;*

*receiving image data for at least a portion of an image to be engraved;*

*determining densities associated with said image;*

*using said at least one parameter and said densities for facilitating the management of ink; and*

*determining a cell description using cell shape parameters.*

*66. The method as recited in claim 65 wherein said method further comprises the step of:*

*tuning said cell description using said at least one parameter.*

*67. The method as recited in claim 66 wherein said method further comprises the step of:*

*inputting at least one parameter comprising at least one of the following: channel width, taper, circumferential linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*68. A method for managing ink comprising the steps of:*

*inputting at least one parameter;*

*receiving image data for at least a portion of an image to be engraved;*

*determining densities associated with said image;*

*using said at least one parameter and said densities for facilitating the management of ink; and*

*inputting at least one parameter comprising at least one of the following: channel width, taper, circumferential*

*linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*69. A method for managing ink comprising the steps of:*

*inputting at least one parameter;*

*receiving image data for at least a portion of an image to be engraved;*

*determining densities associated with said image;*

*using said at least one parameter and said densities for facilitating the management of ink; and*

*using the following equation to determine an amount of ink:*

$$Volume/cell = \frac{P \tan\frac{\theta}{2}}{8} \{3D_1^2 + 2D_0D_1 + 3D_0^2\}$$

$$b = \frac{1}{s},$$

*θ is a stylus tip angle;*

*s is screen in lines/micron;*

*b is a length of a side of a normal cell in microns;*

$$P = \sqrt{2 \tan\Phi}\ b;$$

*P is the period of the sine wave mentioned earlier herein;*

*ϕ is a screen angle;*

*$D_0$=depth of channel in microns; and*

*$D_1$=total depth a stylus travels into copper.*

*70. A method for managing ink comprising the steps of:*

*inputting at least one parameter;*

*receiving image data for at least a portion of an image to be engraved;*

*determining densities associated with said image;*

*using said at least one parameter and said densities for facilitating the management of ink; and*

*using the following equation to determine an amount of ink;*

$$Volume/cell = \frac{\tan\frac{\theta}{2}}{2}\left[\frac{3D_1^2 - 2D_0D_1 + 3D_0^2}{4} L + (D_1^2 - D_0^2)\frac{P}{\pi}\sin\left(\frac{L}{P}\pi\right) + (D_1 + D_0)^2\frac{P}{8\pi}\sin\left(\frac{L}{P}2\pi\right)\right]$$

$$b = \frac{1}{s},$$

*θ is a stylus tip angle;*

*s is screen in lines/micron;*

*b is a length of a side of a normal cell in microns;*

$$P = \sqrt{2 \tan\Phi}\ b;$$

*P is the period of the sine wave mentioned earlier herein;*

$$L = \frac{2P}{\pi}\tan^{-1}\left(\sqrt{\frac{D_1}{D_0}}\right);$$

*L is the cell length in direction of cutting;*

*$D_1$ is a depth of a cell; and*

*$D_0$ is the amplitude of a sine wave (to be derived from user inputs) minus the depth of the cell.*

*71. An engraving system comprising:*

*an engraver having an engraving head for engraving a workpiece; and*

*a computer coupled to said engraver for inputting at least one parameter associated with an engraved area for receiving ink, for receiving image data for at least a portion of an image to be engraved without simultaneously rotatably scanning said portion of said image to be engraved; for determining densities associated with said image; and also for using said at least one parameter and said densities for facilitating the management of ink.*

*72. The engraving system as recited in claim 71 wherein said computer further comprises:*

*means for determining an amount of ink in response to both said at least one parameter and said densities.*

*73. The engraving system as recited in claim 72 wherein said amount of ink comprises a volume of ink.*

*74. The engraving system as recited in claim 71 wherein said computer further comprises:*

*a processor for composing a layout of said at least one image.*

*75. The engraving system as recited in claim 71 wherein said computer further comprises means for determining an amount of ink to be used by a workpiece using said image data and said at least one parameter.*

*76. The engraving system as recited in claim 75 wherein said workpiece comprises a cylinder.*

*77. An engraving system comprising:*

*an engraver having an engraving head for engraving a workpiece; and*

*a computer coupled to said engraver for inputting at least one parameter, for receiving image data for at least a portion of an image to be engraved; for determining densities associated with said image; and also for using said at least one parameter and said densities for facilitating the management of ink;*

*said computer further comprising:*

*generating means for generating a histogram corresponding to densities associated with at least a portion of said image.*

*78. The engraving system as recited in claim 77 wherein said generating means comprises:*

*means for determining a cell description using cell shape parameters.*

*79. The engraving system as recited in claim 78 wherein said computer further comprises:*

*tuning means for tuning said cell description using said at least one parameter.*

*80. The engraving system as recited in claim 79 wherein said at least one parameter comprises at least one of the following; channel width, taper, circumferential linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*81. An engraving system comprising:*

*an engraver having an engraving head for engraving a workpiece; and*

*a computer coupled to said engraver for inputting at least one parameter, for receiving image data for at least a portion of an image to be engraved; for determining densities associated with said image; and also for using said at least one parameter and said densities for facilitating the management of ink;*

*said at least one parameter comprises at least one of the following; channel width, taper, circumferential linearization, balance correction, edge enhancement, density threshold levels, fast forward, screen, screen angle, highlight cell width, wall size, vertical spacing, channel voltage, highlight voltage, channel depth, cell depth, cell length, shadow voltage, shadow cell width and/or stylus angle.*

*82. An engraving system comprising:*

*an engraver having an engraver head for engraving a workpiece; and*

*a computer coupled to said engraver for inputting at least one parameter, for receiving image data for at least a portion of an image to be engraved; for determining densities associated with said image; and also for using said at least one parameter and said densities for facilitating the management of ink;*

*wherein said computer uses the following formula to determine an amount of ink:*

$$Volume/cell = \frac{P \tan\frac{\theta}{2}}{8} \{3D_1^2 + 2D_0D_1 + 3D_0^2\}$$

$$b = \frac{1}{s},$$

*θ is a stylus tip angle;*

*s is screen in lines/microns;*

*b is a length of a side of a normal cell in microns;*

$$P = \sqrt{2 \tan\Phi}\ b;$$

*P is the period of the sine wave mentioned earlier herein;*

*ϕ is a screen angle;*

*$D_0$=depth of channel in microns; and*

*$D_1$=total depth a stylus travels into copper.*

*83. An engraving system comprising:*

*an engraver having an engraver head for engraving a workpiece; and*

*a computer coupled to said engraver for inputting at least one parameter, for receiving image data for at least a portion of an image to be engraved; for determining densities associated with said image; and also for using said at least one parameter and said densities for facilitating the management of ink;*

*wherein said computer uses the following formula to determine an amount of ink:*

$$Volume/cell = \frac{\tan\frac{\theta}{2}}{2}\left[\frac{3D_1^2 - 2D_0D_1 + 3D_0^2}{4} L + (D_1^2 - D_0^2)\frac{P}{\pi}\sin\left(\frac{L}{P}\pi\right) + (D_1 + D_0)^2\frac{P}{8\pi}\sin\left(\frac{L}{P}2\pi\right)\right]$$

$$b = \frac{1}{s},$$

*θ is a stylus tip angle;*

*s is screen in lines/micron;*

*b is a length of a side of a normal cell in microns;*

$$P = \sqrt{2 \tan\Phi}\ b;$$

*P is the period of the sine wave mentioned earlier herein;*

$$L = \frac{2P}{\pi}\tan^{-1}\left(\sqrt{\frac{D_1}{D_0}}\right);$$

*L is the cell length in direction of cutting;*

*$D$ is a depth of a cell; and*

*$D_0$ is the amplitude of a sine wave (to be derived from user inputs) minus the depth of the cell.*

* * * * *